Patented Nov. 11, 1947

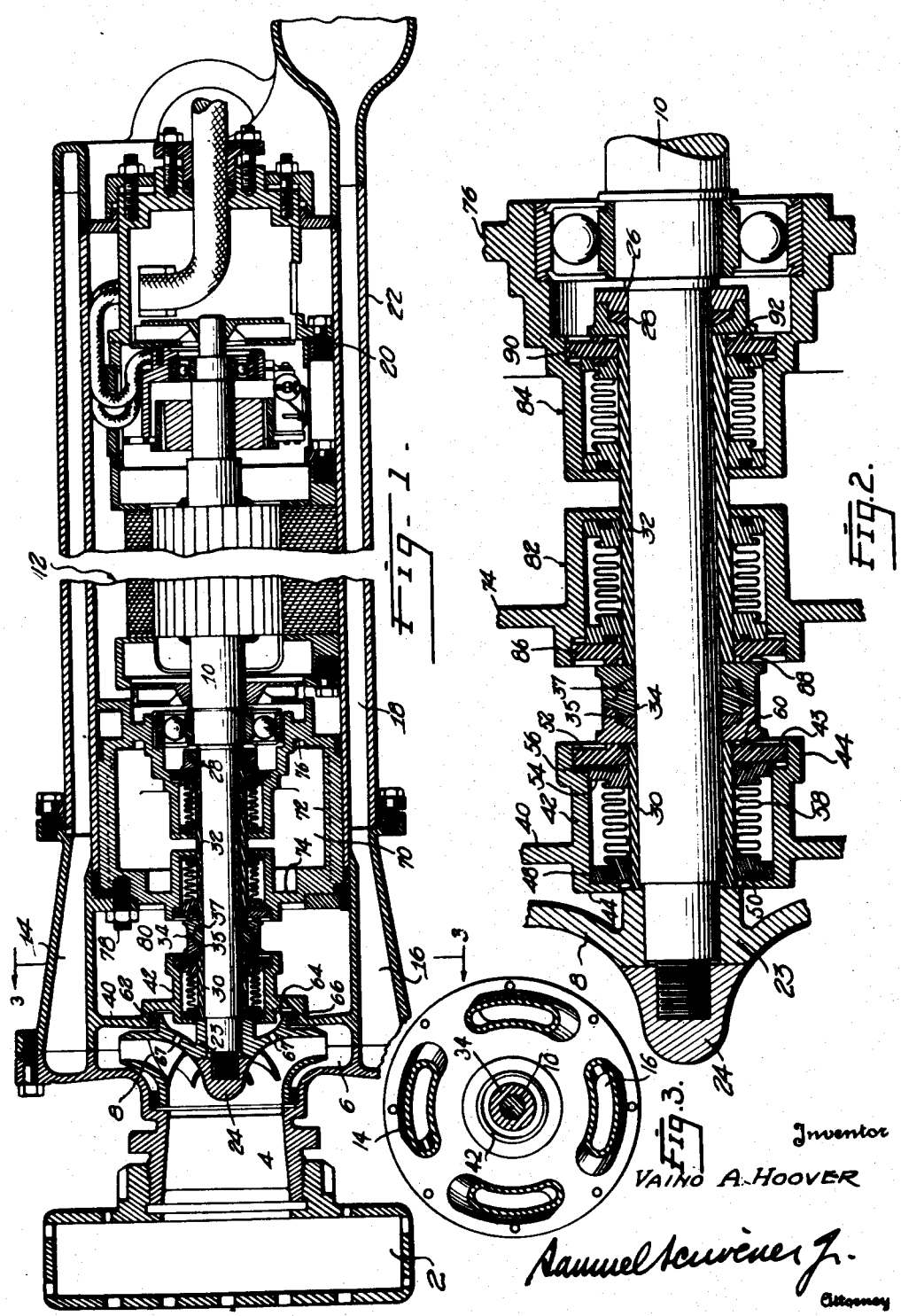

2,430,509

UNITED STATES PATENT OFFICE 2,430,509

SHAFT SEAL FOR SUBMERSIBLE PUMPS

Vaino A. Hoover, Los Angeles, Calif., assignor to Electrical Engineering and Manufacturing Corporation, Los Angeles, Calif., a corporation of California Application November 6, 1943, Serial No. 509,291

8 Claims. (Cl. 103—87)

This invention has to do, in general, with pumps of the type which are adapted to be submerged in the liquid to be pumped and which include an impeller driven by an electric motor which forms part of the submersible assembly. In such devices it is usual to provide sealing means to prevent seepage of pumped fluid, such as water, along the shaft and into the motor housing, but no such means are now known which adequately seal the motor housing of submersible pump devices from entry of the water in which the device is submerged.

It is, accordingly, the primary object of the invention to provide new and improved means which will be effective to completely seal the motor housing of a submersible pump. It is one of the objects of the invention to provide a pump and motor structure and sealing means which will isolate the shaft connecting the motor and pump from the high delivery pressure of the pump, whereby the shaft seal will be subject only to the relatively low submergence pressure. It is a further object of the invention, having particular reference to pump devices in which an oil chamber surrounds the drive shaft at its entry into the motor housing, to provide sealing means isolating the oil chamber from the water in which the pump is submerged and isolating the motor housing from the oil chamber. It is a still further object to provide common means for holding all of a plurality of shaft sealing means in fixed axial position on the shaft and for determining the sealing pressure of sealing means forming part thereof.

Other objects and features of novelty of the invention will be made apparent by the following description and the annexed drawings which, it will be understood, are only illustrative of the invention and impose no limitation thereon not imposed by the appended claims.

Referring to the drawings, in which similar reference numerals refer to like parts, Fig. 1 is a longitudinal, cross-sectional view of a submersible pump device including shaft sealing means according to this invention, and Fig. 2 is an enlarged view of parts shown in Fig. 1, showing particularly the shaft sealing means according to the invention.

Figure 3 is a cross-sectional view taken along the line 3—3 of Figure 1, looking in the direction of the arrows.

The submersible pump device illustrated in the drawings comprises the intake 2 which communicates through passage 4 with a volute chamber 6 within which an impeller 8 is rotatably mounted on the shaft 10 of a driving motor 12. The impeller discharges into two circumferentially spaced volutes 14, 16 which, in turn, discharge into the annular passage 18 between the inner and outer walls 20, 22 of a cylindrical casing which surrounds and encloses the motor 12.

The drive shaft 10 is relatively elongated and at its outer end is provided with a reduced-diameter part to which the hub 23 of impeller 8 is attached and with a threaded end part on which a nut 24 is received and by means of which the impeller is held on the shaft and its position thereon may be adjusted. Adjacent the motor the shaft is provided with a shoulder 26 against which one face of a shaft seal 28 abuts, which is of a type comprising two axially-separable parts defining a recess therebetween of a definite shape within which a shaft gasket of another shape is placed, whereby upon pressure of the two parts toward each other the gasket is deformed into sealing engagement with the shaft. The area of the recess is slightly greater than the cross-sectional area of the gasket so that in the compressed condition of the gasket a metal-to-metal contact is maintained between the faces of the rings defining the recess. Thus, the axial position of the face of the shaft seal is fixed by the metallic parts and is not dependent upon the degree of compression of the shaft gasket. This assures a predetermined axial position for each of the shaft seal rings and further assures that the face of the seal ring is in true radial relation to the axis of rotation of the shaft. The shaft 10 is surrounded throughout substantially its entire length by sleeves, a relatively short sleeve 30 being positioned adjacent the impeller and a relatively long sleeve 32 being positioned adjacent the motor. A shaft sealing device 34, which is preferably formed of some hard material such as stainless steel is disposed between and abuts the adjacent ends of the sleeves and is preferably of the same type as seal 28, including therein the two spaced shaft gaskets 35, 37. The described parts, i. e. nut 24, impeller 8, sleeve 30, shaft seal and gaskets 34, 35, 37, sleeve 32 and shaft seal 28 all rotate with the shaft and form a surrounding cover therefor extending from the outer extremity of the shaft to the motor end thereof. As these parts form a continuous series along the shaft the nut 24 may be used to adjust the engagement between them and to clamp them in fixed axial positions.

The motor end of the impeller chamber 6 is closed by a wall 40 which extends radially inwardly from the surrounding volute casing and between which and the shaft sleeve 30 sealing means are provided to prevent water at the delivery pressure of the impeller from coming into contact with the drive shaft, whereby seepage along the shaft is substantially prevented. Such means comprise a cylindrical part 42 which forms an integral part of wall 40 and which surrounds and is spaced from the sleeve 30 and which, at its impeller end, is formed with an inturned annular flange 44, the inner periphery of which is closely adjacent the outer surface of sleeve 30. Within the cylindrical part 42 and surrounding the sleeve 30 adjacent the inturned flange 44 is an annular member 48 having a recess in the impeller face thereof within which a sealing ring 50 is disposed. A seal ring 52, which is preferably formed of some soft material such as graphite, is disposed within the opposite or motor end of cylinder 42 and is provided with peripheral ears 43 which are received within corresponding recesses 44 in the cylinder 42, whereby the seal ring is held from rotation. The impeller face of seal ring 52 is engaged by an annular member 54, which is of the same form as annular member 48 and motor face of which is recessed to receive a sealing ring 56. A compressed metal bellows 58, which may be formed of corrosion-resisting material such as Monel metal, is disposed between the annular members 48, 54 and has its ends soldered or brazed thereto and urges them apart, thereby maintaining sealing ring 50 in tight engagement with the motor face of inturned flange 44 and sealing ring 56 in tight engagement with the impeller face of seal ring 52. The motor face of seal ring 52 is formed with an annular ridge 60 which sealingly engages the impeller face of shaft seal 34. In order to assist in preventing water at pump discharge pressure from coming into contact with the shaft, the wall 40 is provided with an offset part 62 which is parallel to shaft 10, and the motor face of the impeller may be provided with a flange 64 which is parallel to and spaced from offset 62 and has a running fit with a sealing ring 66 carried by the wall offset. An opening 67 is formed in the impeller between the hub thereof and the flange 64 and vents the chamber behind the sealing ring 66.

It will be seen that the described structure will prevent water at the discharge pressure of the impeller from coming into contact with shaft 10. The sealing ring 66 provides a first seal and any water passing it will be kept from traveling along shaft 10 by the shaft gaskets 35, 37.

In accordance with the invention an oil chamber 70 is interposed between the motor 12 and the chamber on the motor side of wall 40 within which water at the submergence pressure is admitted through the space between the volutes. The oil chamber is partially filled with oil, the amount thereof being sufficient for the required lubricating purposes, and there being sufficient air within the casing to cushion any water which may get into it. The oil chamber comprises a cylindrical wall 72, a part of the outer surface of which is in sealing engagement with the inner wall of casing member 20, and spaced radial walls 74, 76 which are formed integrally with cylindrical wall 72 and one of which, 74, is attached by bolts 78 to a flange 80 which extends radially inwardly from the main casing member, thereby rigidly positioning the oil chamber with respect to other parts of the assembly. Sealing assemblies 82, 84 are provided between each of radial walls 74, 76 respectively and sleeve 32 and are preferably similar in construction and assembly to the described sealing assembly between wall 40 and 30. Sealing assembly 82, which is associated with wall 74, is reversed with respect to the sealing assembly associated with wall 40 and the seal ring 86 thereof has an annular ridge 88 on its impeller face which bears on the motor face of rotating shaft seal 34. Sealing assembly 84 is disposed similarly to the sealing assembly associated with wall 40 and the seal ring 90 thereof has an annular ridge 92 on its motor face which bears on the impeller face of rotating shaft seal 28. The principal sealing means are those provided by the fixed rings 52, 86 and 90 and the abutting, rotating shaft seals 34 and 28. These sealing means are isolated from each other by shaft gaskets 35 and 37 which positively prevent any water which may leak past the sealing means from passing along the shaft.

It will be seen that certain important new functions and results are achieved by the described sealing means forming this invention. First, the shaft seals 28 and 34 may be tightened or adjusted as desired by means of the nut 24, the movement thereof being transmitted to the shaft seals through impeller 8 and sleeves 30, 32. Second, the sealing means associated with wall 40 prevents water at impeller discharge pressure from traveling along the shaft and coming in contact with the shaft seals for the oil chamber and motor chamber. Third, the sealing means 82 associated with wall 74, prevents water at submergence pressure from coming into contact with the shaft and also from entering oil chamber 70. Fourth, the sealing means 84 associated with wall 76 prevents oil in chamber 70 from passing into the housing of motor 12. Fifth, the initial compression of the bellows of the various sealing means is determined by the position of nut 34. Sixth, the motor housing is completely isolated from water at impeller discharge pressure.

While I have described and illustrated one form which my invention may take, it will be apparent to those skilled in the art that other embodiments, as well as modifications of that disclosed, may be made without departing in any way from the spirit or scope of the invention, for the limits of which reference must be had to the appended claims.

I claim:

1. A submersible pump comprising an elongated cylindrical casing having spaced concentric walls forming therebetween an annular passage for fluid having an intake opening and a delivery opening, a motor within the casing, an impeller adjacent one end of the casing, a shaft drivingly connecting the motor to the impeller, sealing means surrounding said shaft, and an annular series of volute passages surrounding said sealing means and shaft and connected to deliver fluid pumped by said impeller to said annular passage, said volute passages being spaced from each other whereby fluid in which the pump is submerged may pass therebetween into free contact with said sealing means to thereby cause said sealing means to be subject only to the submergence pressure.

2. A submersible pump comprising an elongated cylindrical casing having spaced concentric walls forming therebetween an annular passage for fluid having an intake opening and a delivery opening, a motor within the casing, an impeller adjacent one end of the casing, a shaft drivingly connecting the motor to the impeller, spaced radial walls surrounding the shaft between the motor and the impeller, sealing means between each of said walls and the shaft, and an annular series of volute passages between said walls and surrounding the shaft and connected to deliver fluid pumped by said impeller to said annular passage, said volute passages being spaced from each other whereby fluid in which the pump is submerged may pass therebetween into free contact with said sealing means to thereby cause said sealing means to be subject only to the submergence pressure.

3. A submersible pump comprising an elongated cylindrical casing having spaced concentric walls defining an annular passage for fluid having a discharge opening and an intake opening, an impeller adapted to force fluid into said passage through said intake opening, a motor within said casing, a driving shaft connecting the motor to the impeller, and means for sealing the motor from the fluid delivered by the impeller comprising two axially-spaced partitions surrounding said shaft between the motor and the impeller, one of said partitions being positioned within and closing the casing adjacent the motor and the other being positioned within and closing the casing adjacent the impeller, said partitions being integrally connected at their outer peripheries by a cylindrical wall which engages and is releasably attached to said cylindrical casing, and sealing means between each of said partitions and said shaft.

4. A submersible pump comprising an elongated cylindrical casing having spaced concentric walls defining an annular passage for fluid having an exhaust opening and an intake opening, an impeller adapted to force fluid into said passage through said intake opening, a motor within said casing having driving shaft connection with said impeller, and means for sealing the motor housing from the pumped fluid and comprising two axially-spaced partitions both of which surround said shaft and one of which is positioned within and closes the casing adjacent the impeller end of the motor and the other of which is positioned within and closes the casing at the extremity of the impeller end thereof, said partitions being integrally connected at their outer peripheries, and sealing means between each of said partitions and said shaft.

5. A submersible pump comprising an elongated cylindrical casing having spaced concentric walls defining an annular passage for fluid having an exhaust opening and an intake opening, an impeller adapted to force fluid into said passage through said intake opening, a motor within said casing having driving shaft connection with said impeller, and means for sealing the motor housing from the pump fluid, said sealing means comprising a partition surrounding the shaft within said casing and having an integral cylindrical part surrounding the shaft, a sealing ring surrounding the shaft within one end of the cylindrical member, a pressure ring surrounding the shaft within the cylindrical member and abutting one axial side of the sealing ring, and an imperforate, and compressed bellows surrounding the shaft within the cylindrical member and constantly urging the pressure ring into engagement with the sealing ring.

6. A submersible pump comprising an elongated cylindrical casing having spaced concentric walls defining an annular passage for fluid having an exhaust opening and an intake opening, an impeller adapted to force fluid into said passage through said intake opening, a motor within said casing having driving shaft connection with said impeller, and means for sealing the motor housing from the pump fluid, said sealing means comprising a sealing ring surrounding the shaft between the motor and the impeller, sleeves surrounding said shaft and extending from the sealing ring toward the impeller and motor respectively, a wall connected to the casing adjacent the impeller and having an integral cylindrical part surrounding the shaft, sealing means surrounding the shaft within the cylindrical part and constantly exerting axial pressure on the sealing ring, a second wall connected to the casing between the sealing ring and the motor and having an integral cylindrical part surrounding the shaft, and sealing means surrounding the shaft within the cylindrical member and constantly exerting axial pressure on the sealing ring in a direction opposite to that of the first pressure-exerting means.

7. In combination, a submersible pump comprising an impeller, a driving motor for the impeller, a shaft connecting the motor and impeller, a sleeve closely surrounding the shaft adjacent the impeller and rotatable therewith, a second sleeve closely surrounding the shaft adjacent the motor and rotatable therewith, a shaft seal surrounding the shaft between said sleeves and abutting the adjacent ends thereof and rotatable therewith, and means for adjusting the impeller longitudinally of the shaft to adjust the position and relation of the sleeves and the seal on the shaft.

8. In combination, a submersible pump comprising an impeller, a driving motor for the impeller, a shaft connecting the motor and impeller, a sleeve closely surrounding the shaft adjacent the impeller, a second sleeve closely surrounding the shaft adjacent the motor, a shaft seal surrounding the shaft between said sleeves and abutting the adjacent ends thereof, a second shaft seal surrounding the shaft and disposed between the end of the second sleeve and the motor, and means maintaining said sleeves and seals in predetermined relation and position on the shaft.

VAINO A. HOOVER.

REFERENCES CITED

The following references are of record in the file of this patent:

UNITED STATES PATENTS

| Number | Name | Date |
| --- | --- | --- |
| 2,320,708 | Yost | June 1, 1943 |
| 1,427,974 | Sessions | Sept. 5, 1922 |
| 1,638,387 | Baldwin | Aug. 9, 1927 |
| 2,243,208 | Hawley, Jr. | May 27, 1941 |
| 2,218,003 | Hawley, Jr. | Oct. 15, 1940 |
| 2,217,746 | Hawley, Jr. | Oct. 15, 1940 |
| 2,020,513 | Mendenhall et al. | Nov. 12, 1935 |
| 1,879,625 | Mendenhall et al. | Sept. 27, 1932 |
| 1,886,714 | Moss | Nov. 8, 1932 |
| 1,428,238 | Keating | Sept. 5, 1922 |